March 14, 1967
R. W. LEE ET AL
3,308,995
DISPENSING DEVICE
Filed June 1, 1965
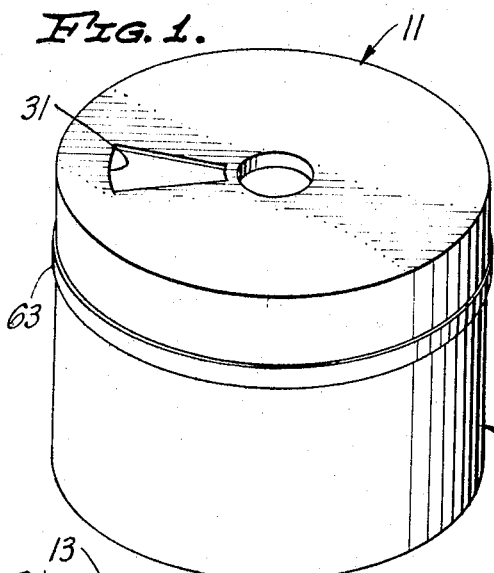
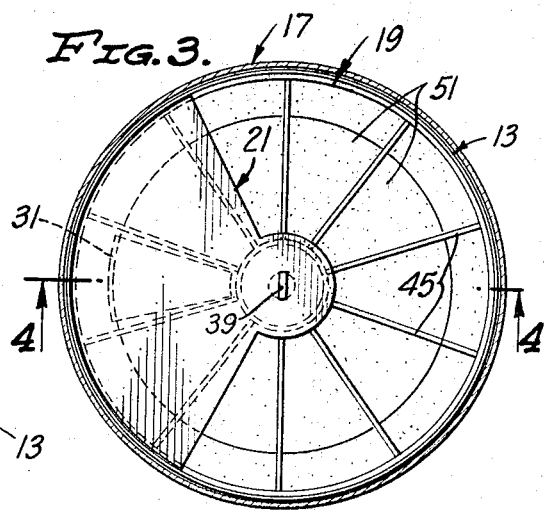
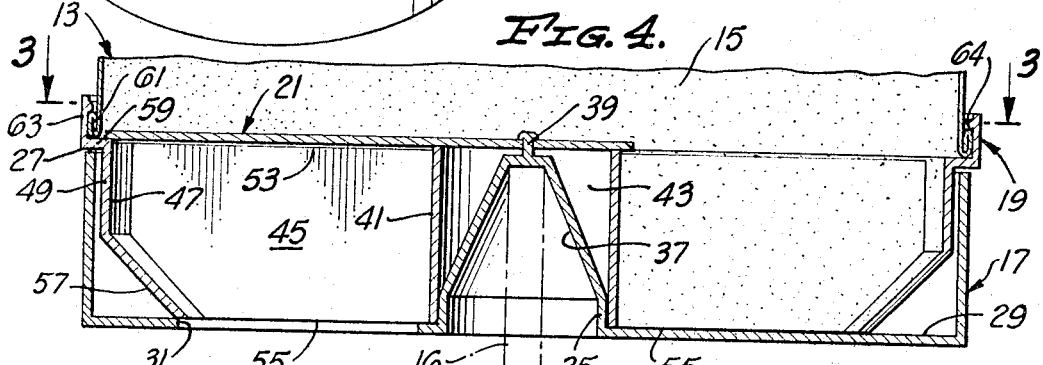
INVENTORS
ROBERT W. LEE,
BERNELL W. SCHWINDT
BY THEIR ATTORNEYS
HARRIS, KIECH, RUSSELL & KERN

United States Patent Office 3,308,995
Patented Mar. 14, 1967

3,308,995
DISPENSING DEVICE
Robert W. Lee, 5344 Parmerton Drive, Temple City, Calif. 91780, and Bernell Schwindt, 20525 San Gabriel Valley Drive, Walnut, Calif. 91789
Filed June 1, 1965, Ser. No. 460,458
5 Claims. (Cl. 222—427)

This invention relates to a dispensing device of the type which is attachable to a container and which dispenses a metered quantity of flowable material held within the container. The dispensing device described herein is particularly suited for dispensing granular material such as coffee; however, it may be used with other kinds of flowable materials.

Prior art dispensers of this general type are generally relatively complex and many require slots and operating handles in order to function. Also, many are not operable in response to unidirectional rotation of one of the dispenser members relative to another member of such dispenser.

Accordingly, it is an object of this invention to provide a dispenser of simple construction requiring only three elements. The construction is further simplified by molding each of the three elements from plastic material.

Another object of this invention is to provide a dispenser for flowable material which dispenses such material by unidirectional rotation of one member of the dispenser relative to another member of the dispenser, such rotation being accomplished without slots or operating handles.

Another object of this invention is to facilitate assembly by employing guiding surfaces on at least two members thereof which guide such members into the desired structural interrelationship. More particularly, it is an object of this invention to utilize conical surfaces to facilitate assembly of the dispenser.

Prior art dispensers of granular material often allow some of such material to get between the relatively rotatable surfaces thereof to retard or hamper rotation. It is an object of this invention to provide a dispenser which produces a wiping action between at least some of these surfaces to wipe the granular material therefrom to facilitate the relative rotation necessary for dispensing and to substantially prevent sticking or jamming.

A further object of this invention is to provide a dispenser for flowable material including an inner member having a plurality of compartments with open upper and open lower ends for measuring quantities of flowable material, the inner member also including integral annular means adjacent the upper ends of the compartments for releasably securing an open topped container thereto, an outer shell receiving the inner member in telescoping relationship therewith for rotation relative thereto, the shell including a lower wall partially closing the lower end thereof and the lower ends of the compartments leaving a dispensing port registrable with at least one of the compartments, cover means for covering the open upper end of at least one of the compartments, and means for rotating the cover means and the shell in one direction relative to the inner member to dispense metered quantities of flowable material. More particularly, the annular means may include an annular shoulder which supports an outer end portion of the cover means.

The invention, both as to its organization and method of operation, together with further objects and advantages thereof, may best be understood by reference to the following description taken in connection with the accompanying drawing in which:

FIG. 1 is a perspective view of an inverted dispenser secured to a container for flowable material;

FIG. 2 is an exploded perspective view of the dispenser;

FIG. 3 is a plan view in section taken along line 3—3 of FIG. 4 and showing the dispenser and container combination;

FIG. 4 is an enlarged fragmentary sectional view taken along line 4—4 of FIG. 3;

FIG. 5 is a fragmentary sectional view illustrating a modification of this invention; and FIG. 6 is a fragmentary sesctional view taken along line 6—6 of FIG. 5.

Referring to the drawing, FIG. 1 shows a dispenser 11 secured to an open topped container 13 having flowable material 16 (FIG 4) therein Although the flowable material 15 may be any of a variety of granular, powdered, or particulate materials, the dispenser 11 has been found particularly useful in dispensing metered quantities of coffee. To operate the dispenser, it must be inverted from the position shown in FIG. 1. When in the operating position, the dispenser 11 may be fitted over a tube 16 of a coffee percolator and rest on or in a coffee grain basket thereof and discharge coffee directly therein.

As shown in FIG. 2, the dispenser includes an outer shell 17, an inner tubular member 19, and a cover plate 21. The outer shell 17 includes a generally cylindrical outer wall 23 having an inner surface 25 and an open upper end 27. The lower end of the shell 17 is partially closed by a lower wall 29, the lower wall having a sector-shaped dispensing port 31 therein. An axial hollow shaft 33 extends upwardly from and is integral with the lower wall 29. The shaft 33 has a cylindrical section 35, a frustoconical section 37, and a rod-like section 39.

The inner tubular member 19 is open at both ends and includes wall means or a cylindrical sleeve 41 which defines a central opening 43 extending axially through the inner member. A plurality of radial, flat, plate-like vanes 45 extends outwardly from the sleeve 41 and into contact with an inner wall surface 47 of an outer wall 49 of the inner member 19. The vanes 45, the sleeve 41, and the outer wall 49 define a plurality of compartments 51 which have open upper ends 53 and open lower ends 55 (FIG. 4). Although ten compartments 51 of equal volume are illustrated, it should be understood that other number of compartments having the same or different sizes may be employed. The lower portion of the outer wall 49 tapers inwardly to form a lower, generally conical, peripheral surface 57. The inner surface 25 of the shell 17 has a substantially larger diameter than the smallest diameter of the lower conical surface 57 and a slightly larger diameter than the wall surface 47. The inside diameter of the sleeve 41 is slightly greater than the outside diameter of the cylindrical section 35 and substantially greater than the smallest diameter of the frustoconical section 37.

The inner member 19 includes integral annular means or a stepped portion adjacent the upper ends 53 of the compartments 51 for releasably and rigidly securing the container 13 thereto. As shown in FIG. 4, such means includes an annular shoulder 59 on the inner member 19 engageable with an open end 61 of the container 13 and an annular peripheral lip 63 having an annular peripheral ridge 64 and extending upwardly from such shoulder for engaging and securing the container to the inner member.

In assembling the dispenser, the open upper end 27 of the shell 17 receives the inner member 19 in telescoping relationship as shown in FIG. 4. The lower conical surface 57 of the inner member 19 cooperates with the inner surface 25 of the shell and the conical surface of the frustoconical section 37 cooperates with the central opening 43 to guide the inner member into such telescoping relationship with the shell. The cover plate 21 is suitably secured to the rod-like section 39 of the shell 17 for rotation therewith. The cover plate 21 is a flat generally sector-shaped plate preferably having sufficient width to cover approximately three and one-half of the compartments 51. The cover plate 21 is supported by the top end of the sleeve 41 and by the annular shoulder 59 as shown in FIG. 4.

In the assembled condition, the lower end of the inner member 19 may be supported by the lower wall 29, and the downwardly facing portion of the shoulder 59 may be supported by the upper end 27 of the shell. The dispensing port 31 is in register with one of the compartments 51 and the cover plate 21 covers such compartment and the adjacent compartments. Preferably, the circumferential dimensions of the slot 31 are slightly less than the corresponding dimensions of the compartments 51 (FIG. 3). The slot 31 extends radially to the bottom outside surface of the conical surface 57 (FIG. 4). The lower conical surface 57 tapers inwardly to the inner edge of the dispensing port 31.

With the dispenser 11 thus assembled, the end 61 of the container 13 may be forced within the lip 63 and retained by the ridge 64 as shown in FIG. 1. The entire container-dispenser combination may then be inverted to the position shown in FIG. 4 and the internal conical surface of the frustoconical section 37 guides the dispenser 11 into position over the tube 16. In this position, all of the compartments 51 except those covered by the cover plate 21 are filled with the flowable material 15. The cover plate 21 prevents the compartment 51 which is in register with the dispensing port 31 and the adjacent compartments from being filled with flowable material. In this position, the shell 17 and the cover plate 21 are rigidly interconnected so that they will rotate together, and the container 13 and the inner member 19 are rigidly interconnected by the lip 63 so that they will rotate together and relative to the shell and the cover plate. By holding the shell 17 in position and rotating the container 13 and the inner member 19, one of the full compartments 51 may be brought into register with the dispensing port 31 to allow the flowable material contained therein to discharge through the port into an appropriate receptacle (not shown). If such rotation is continued, a second full compartment 51 will be brought into register with the port 31 and the contents thereof discharged in the same manner. Thus, the amount of material 15 dispensed depends upon the amount of rotation. Of course, the outer surface of the lip 63 and the shell 17 may be appropriately calibrated to advise the user of the amount of rotation required to dispense a given amount of the flowable material 15. It should be noted that as the emptied compartments 51 are rotated from beneath the cover plate 21, they will be sequentially filled with the flowable material. Thus, by unidirectional rotation the compartments 51 will sequentially discharge metered quantities of the flowable material and the emptied compartments will be sequentially filled.

An important feature of this invention is that the dispensing action may be achieved without multidirectional relative rotation and without the need for special slots or operating levers to cause such relative rotation. Another feature of this invention is the supporting means for the cover plate 21. Such means include the top portions of the wall 41 and a portion of the annular shoulder 59. These surfaces provide a smooth bearing surface for the cover plate 21 allowing the latter to freely rotate thereon. For simplicity, it is preferred to mold the shell 17, the inner member 19, and the cover plate 21 of plastic material, although such elements of the device could also be formed from a metal.

The modification of FIGS. 5 and 6 is designed to provide a wiping action on the cover plate 21 and the lower wall 29. This embodiment includes a plurality of modified vanes 65, but in every other respect is identical with the embodiment of FIGS. 1–4. The vanes 65 have generally flexible upper and lower end portions 67 which form flexible tapered lips which engage the cover 21 and the lower wall 29. The lips 67 are preferably tapered and curved slightly to provide the desired wiping action. As shown in FIG. 6, the vertical dimension of the vane 65 is greater than the distance between the cover 21 and the lower wall 29 so that the vanes will be of sufficient size to maintain wiping contact with the cover and lower wall. To allow the lips 67 to flex more easily and without interference from the inner wall surface 47 or the sleeve 41 a recess 69 is formed at each end of each of the lips 67 to space the latter slightly from these surfaces. Except for the added advantage of the wiping action, the embodiment of FIGS. 5 and 6 operates in exactly the same manner as the embodiment of FIGS. 1–4.

Many changes, modifications, and substitutions may be made by those having ordinary skill in the art without necessarily departing from the spirit and scope of this invention.

What is claimed is:

1. A dispenser for flowable material adapted for connection to an open topped container having flowable material therein, comprising:

an inner member including wall means defining a generally central opening, said inner member including a plurality of compartments for retaining measured quantities of the flowable material, said compartments having open upper and open lower ends, said inner member including annular means adjacent said upper ends of said compartments for releasably and rigidly securing the open topped container thereto;

an outer shell having upper and lower ends, said upper end of said shell being open and receiving said inner member in telescoping relationship for rotation relative thereto, said shell including a lower wall partially closing said lower end thereof and said lower ends of said compartments, leaving a dispensing port registrable with at least one of said compartments, said shell including a shaft extending upwardly from said lower wall and being received by said generally central opening of said inner member, said shaft having an upwardly converging recess in its lower end; and a cover plate secured to said shaft and rotatable with said shell for covering the open upper end of at least the flowable material flowing from the container into the others of said compartments, unidirectional rotation of said shell relative to said inner member and the container allowing said other compartments to sequentially discharge the flowable material therein through said dispensing port and permitting sequential filling of the compartments which have discharged their contents.

2. A dispenser for flowable material adapted for connection to an open topped container having flowable material therein, comprising:

an inner member having a periphery which is generally circular in cross section and wall means defining a central opening which is generally circular in cross section, said inner member including a plurality of compartments for retaining measured quantities of the flowable material and having open upper and open lower ends around said opening, said inner member including integral annular means above said compartments for releasably and rigidly securing the open topped container thereto, said periphery having a lower portion which is generally frustoconical;

an outer shell having an outer wall with an inner surface of generally circular cross section, said outer shell having upper and lower ends and the diameter of said inner surface at said upper end of said shell being substantially larger than the diameter of said lower portion of said inner member, said upper end of said shell being open and receiving said inner member in telescoping relationship for rotation relative thereto, said shell including a lower wall partially closing said lower end thereof and said lower ends of said compartments, leaving a dispensing port registrable with at least one of said compartments, said shell including a shaft extending upwardly from said lower wall and having an upper conical periphery, said shaft being received by said generally central opening in said inner member, said lower portion of said inner member cooperating with said inner surface of said shell, and said upper conical periphery of said shaft cooperating with said central opening of said inner member to guide said inner member into said telescoping relationship; and cover means connected to the upper end of said shaft for covering the open upper end of at least said one of said compartments.

3. A dispenser for flowable material adapted for connection to an open topped container having flowable material therein, comprising:

an inner tubular member having open upper and open lower ends, said inner member including a plurality of radially extending vanes defining compartments therebetween having open upper and open lower ends and for retaining measured quantities of the flowable material, said vanes having generally flexible upper and lower end portions;

an outer shell having upper and lower ends, said upper end of said shell being open and receiving said inner member in telescoping relationship for rotation relative thereto, said shell including a lower wall partially closing said lower end thereof and said lower ends of said compartments leaving a dispensing port registrable with at least one of said compartments;

a cover plate for covering the open upper end of at least said one of said compartments, said flexible upper and lower end portions of said vanes being engageable with said cover plate and said lower wall, respectively, the flowable material flowing from the container into the other of said compartments; and means for rotating said cover plate with said shell relative to said inner tubular member and the container to allow said other compartments to sequentially discharge the flowable material therein through said dispensing port and permitting sequential filling of the compartments which have discharged their contents, said flexible upper and lower end portions of said vanes providing a wiping action on said cover plate and said lower wall, respectively.

4. A dispenser for flowable material adapted for connection to an open topped container having flowable material therein, comprising:

an inner tubular member having open upper and open lower ends and wall means defining a central opening extending axially therethrough, said inner tubular member having an inner wall surface and a plurality of radial vanes extending from said wall means to said inner wall surface to define a plurality of compartments, said compartments having open upper and open lower ends, said inner tubular member having a step adjacent the upper ends of said compartments defining an annular shoulder and an upwardly extending peripheral lip for securing the container to the inner member;

an outer shell having a generally cylindrical outer wall and upper and lower ends, said upper end of said shell being open and receiving said inner member in telescoping relationship for rotation relative thereto, said shell including a lower wall partially closing said lower end thereof and said lower ends of said compartments, leaving a dispensing port registrable with at least one of said compartments, said shell including an integral axial shaft extending upwardly from said lower wall and being received by said central opening of said inner member, the lower end of said inner member being supported by said lower wall, and said stepped portion being supportable by the upper end of said shell; and a cover plate secured to said shaft and rotatable with said shell for covering the open upper end of at least said one of said compartments.

5. A dispenser for flowable material adapted for connection to an open topped container having flowable material therein comprising:

an inner member including a plurality of compartments with open upper and open lower ends for retaining measured quantities of the flowable material, said inner member being securable to the container;

an outer shell having upper and lower ends, said upper end of said shell being open and receiving said inner member in telescoping relationship for rotation relative thereto, said shell including a lower wall partially closing said lower end thereof and said lower ends of said compartments leaving a dispensing port registrable with at least one of said compartments;

cover means for covering the open upper end of at least said one of said compartments, the flowable material flowing from the container into the other of said compartments;

means for rotating said cover means and said shell relative to said inner member to dispense measured quantities of the flowable material through said dispensing port; and means for wiping at least a portion of the lower surface of said cover means and at least a portion of the upper surface of said lower wall substantially free of the flowable material.

References Cited by the Examiner

UNITED STATES PATENTS 2,006,019  5/1935  Holesworth _____ 222—427
2,515,735  7/1950  Saunders _____ 222—427
3,211,334  10/1965  McShea _____ 222—427 X ROBERT B. REEVES, *Primary Examiner.*

HADD S. LANE, *Examiner.*